United States Patent
Nishida et al.

(10) Patent No.: US 6,377,746 B1
(45) Date of Patent: Apr. 23, 2002

(54) RECORDING APPARATUS FOR RECORDING MOVING AND STILL SIGNALS ON DIFFERENT PARTS OF TAPE-SHAPED RECORDING MEDIUM

(75) Inventors: Hideyuki Nishida, Kanagawa-ken; Tsunenori Yoshinari, Tokyo; Katsumi Arisaka; Toshiaki Shingu, both of Kanagawa-ken, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/445,696

(22) Filed: May 22, 1995

Related U.S. Application Data (63) Continuation of application No. 07/959,968, filed on Oct. 13, 1992, now abandoned.

(30) Foreign Application Priority Data

Oct. 18, 1991 (JP) .............................. 3-270916
Oct. 18, 1991 (JP) .............................. 3-270917

(51) Int. Cl.$^7$ ................................ H04N 5/91
(52) U.S. Cl. .......................... 386/81; 386/109
(58) Field of Search .................. 360/35.1, 8, 9.1, 360/71, 72.1, 72.2, 27, 22, 24; 358/134, 142, 133; 386/81, 109, 111, 112, 121

(56) References Cited

U.S. PATENT DOCUMENTS

| | | | | |
|---|---|---|---|---|
| 4,802,019 A | * | 1/1989 | Harada et al. | 360/72.2 X |
| 4,963,992 A | * | 10/1990 | Doi et al. | 386/109 X |
| 5,047,875 A | * | 9/1991 | Kozuki et al. | 360/35.1 |
| 5,124,966 A | * | 6/1992 | Roth et al. | 360/72.2 X |
| 5,126,851 A | * | 6/1992 | Yoshimura et al. | 360/72.2 X |
| 5,225,946 A | * | 7/1993 | Uchiumi | 360/35.1 X |
| 5,430,579 A | * | 7/1995 | Onishi et al. | 360/9.1 |
| 5,535,064 A | * | 7/1996 | Nagasawa et al. | 386/109 |
| 5,734,785 A | * | 3/1998 | Nagasawa et al. | 386/109 X |

* cited by examiner

*Primary Examiner*—Andrew L. Sniezek
(74) *Attorney, Agent, or Firm*—Robin, Blecker & Daley (57) ABSTRACT

An image information recording apparatus is arranged to record compressed image information within a predetermined section of a recording tape extending from a beginning of the tape, to record non-compressed image information in another section located after the predetermined section, and to record, also within the predetermined section, positional information indicative of a position where the non-compressed image information which corresponds to the compressed image information is recorded on the tape, so that all recorded images are quickly graspable and any of the non-compressed images thus can be quickly extracted. Further, in recording image information of a plurality of kinds, a non-recorded area of a tape-shaped recording medium is divided and a divided recording area thus obtained is allocated to some of the image information of different kinds, so that the tape-shaped recording medium can be efficiently used.

11 Claims, 10 Drawing Sheets

FIG. 9(i)  FIG. 9(ii)  FIG. 9(iii)  FIG. 9(iv)  FIG. 9(v)

RECORDING APPARATUS FOR RECORDING MOVING AND STILL SIGNALS ON DIFFERENT PARTS OF TAPE-SHAPED RECORDING MEDIUM

This is a continuation application under 37 CFR 1.62 of prior application Ser. No. 07/959,968, filed Oct. 13, 1992 now abandoned.

BACKGROUND OF THE INVENTION

1. Field of the Invention

This invention relates to a recording apparatus for recording on a tape-shaped recording medium an information signal representing an image or the like.

2. Description of the Related Art

There are many demands for an apparatus arranged to record, on a magnetic tape, data representing a plurality of images and to make an image display by reproducing specific image data included in the recorded image data as necessary. Among such recording media that are capable of flexibly permitting alterations of the contents of the record and recording many image data at a low price, a tape-shaped recording medium or the like (hereinafter referred to as the tape) excels others. Hence, many recording/reproduction apparatuses have been arranged to use the tape.

However, it is a drawback of the tape that a search cannot be quickly accomplished thereon, because the tape intrinsically necessitates sequential access.

Another drawback of the tape lies in that, in order to simply find what kind of image data is recorded, images must be checked and looked up with the naked eye by reproducing the whole record at a high speed. Therefore, operability for making a search has been extremely poor.

Figure 1:
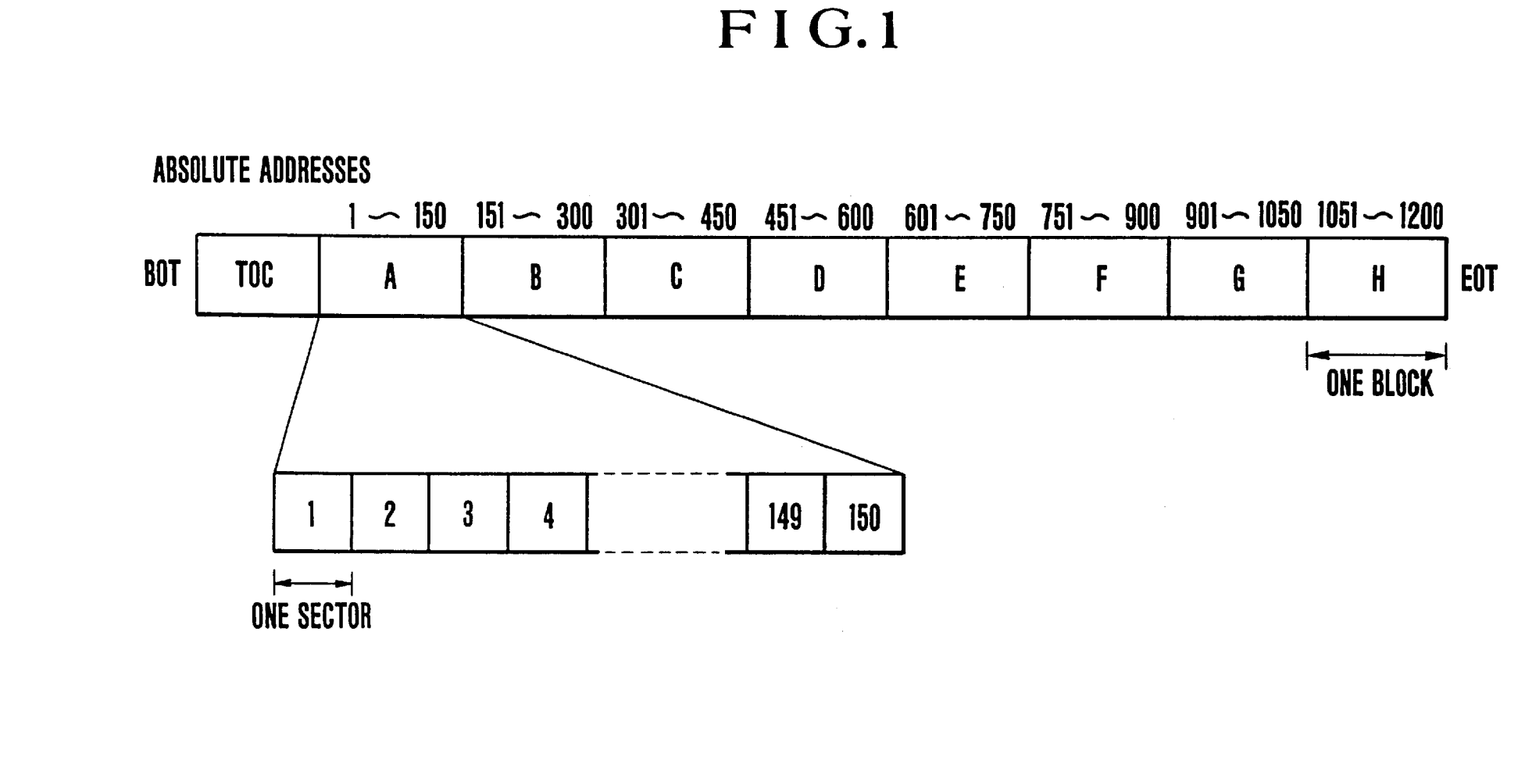
FIG. 1 shows by way of example the conventional method for dividing a recording area on the tape.

Further, in the case of a tape recording apparatus of the kind arranged to record, on the tape, a multiplicity of file data while sorting them into a plurality of kinds, it has been practiced to equally divide a recording area of the tape between the beginning of the tape (hereinafter referred to as BOT) and the end of the tape (hereinafter referred to as EOT) into a number of areas, as shown in FIG. 1, which shows the dividing arrangement of the tape recording area. In the case of FIG. 1, for example, the whole tape is divided into nine areas. With the exception of an area for a table of contents (hereinafter referred to as TOC area) which is a leading part, a remaining recording area of the tape is equally divided into eight areas, each of which is divided into 150 sectors. Information data which are sorted into eight categories are recorded in the respective eight areas as applicable.

In the case of the apparatus of this kind, data to be recorded is prearranged. The recording area of the tape is equally divided into a number of areas as many as the number of kinds or categories to be sorted out. The equally divided recording areas are allocated respectively to the records of applicable categories of information. In making a search after recording, the tape moving extent required for the search is lesser than a search to be made in a random manner on the tape as all related records of information are gathered together within one and the same specific recording area. Besides, a search for related records of information within each sorted category can be quickly accomplished.

However, the above-stated prior art arrangement brings about the following problem, as the recording areas divided on the tape (hereinafter referred to as divided recording areas) have equal fixed spacing lengths.

Figure 2:
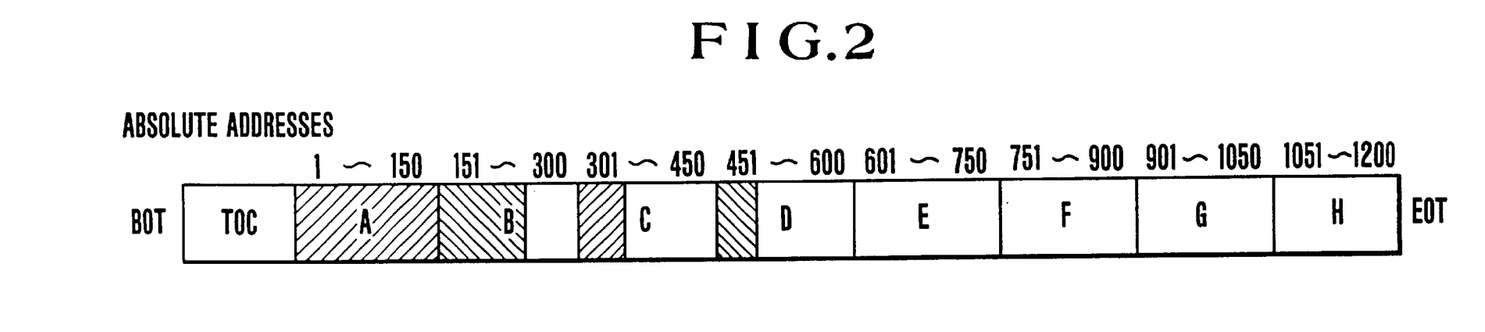
FIG. 2 shows a problem resulting from the adoption of the a ea dividing method shown in FIG. 1.

Referring to FIG. 2, in a case where a large amount of information is recorded, for example, in one divided recording area A as a result of arrangement made on input information as shown in the drawing, empty parts might be left in the divided recording areas B, C and D, while nothing is recorded in other divided recording areas E, F, G and H. Even in such a case, the divided recording area A is alone filled with the recording information (or data). Then, in recording information on one tape by arranging and sorting information, the tape cannot be effectively used because of the many areas left unused on the tape.

Figure 3:
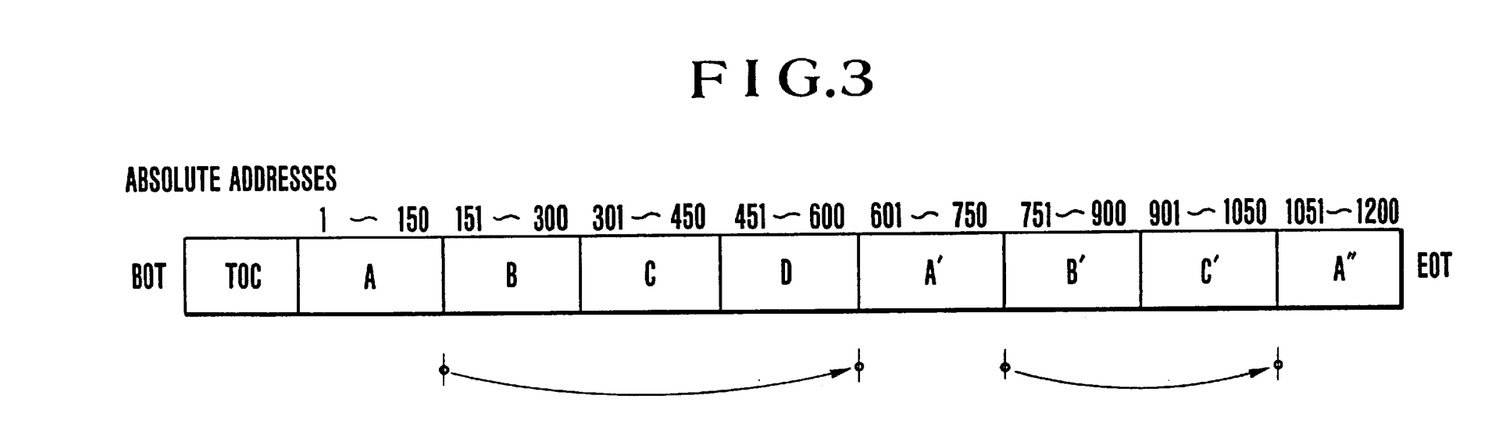
FIG. 3 shows another conventional method for dividing a recording area on the tape.

To solve the above-stated problem, it has been contrived as shown in FIG. 3 to allocate, for example, remaining divided recording areas A', A", B' and C' to the remainders of the information (or data) of sorted kinds recorded on the fully recorded areas A, B and C, in such a way as to effectively use the tape.

In this case, however, the data which has been sorted out for recording within the divided recording area A is recorded not only in the area A but also in the divided recording area A' or A". Therefore, in making a search for the data sorted out to be recorded within the divided recording area A after recording, the tape must be moved to a greater extent for the search from the divided recording area A to the area A' or to another recording area A" or from the area A' to the area A". Therefore, this arrangement requires much time for the search.

SUMMARY OF THE INVENTION

This invention is directed to the solution of these problems.

It is, therefore, an object of this invention to provide a signal recording apparatus which is arranged to be capable of quickly grasping all information recorded on the whole tape-shaped recording medium and to be also capable of quickly extracting any desired information.

Under this object, an image information recording apparatus arranged according to this invention as an embodiment thereof comprises: input means for inputting image information; processing means for processing the image information, the processing means being arranged to be capable of outputting first and second image signals which respectively correspond to the image information, the amount of information of the first image signal being greater than that of the second image signal; and recording means for recording the first and second image signals on a tape-shaped recording medium, the recording means being arranged to record the second image signal only within a predetermined section on the tape-shaped recording medium extending from a beginning of the tape-shaped recording medium and to record the first image signal only within another section located after the predetermined section.

It is another object of the invention to provide a recording apparatus which is arranged to be capable of effectively using a tape-shaped recording medium and also to record signals in such a manner that any desired information is quickly extractable after recording.

Under that object, an image information recording apparatus arranged as another embodiment of the invention comprises: input means capable of inputting a plurality of kinds of image information; recording means for recording the image information on a tape-shaped recording medium; transport means for transporting the tape-shaped recording medium in a longitudinal direction thereof; discrimination means for making a discrimination between a recorded area and an unrecorded area on the tape-shaped recording medium; and area determining means for determining a recording area on the tape-shaped recording medium for each kind of the plurality of kinds of image information, the area determining means being arranged to act in accordance with a result of the discrimination made by the discrimination means.

The above and other objects and features of the invention will become apparent from the following detailed description of embodiments thereof taken in conjunction with the accompanying drawings.

DETAILED DESCRIPTION OF THE PREFERRED EMBODIMENTS

Figure 4:
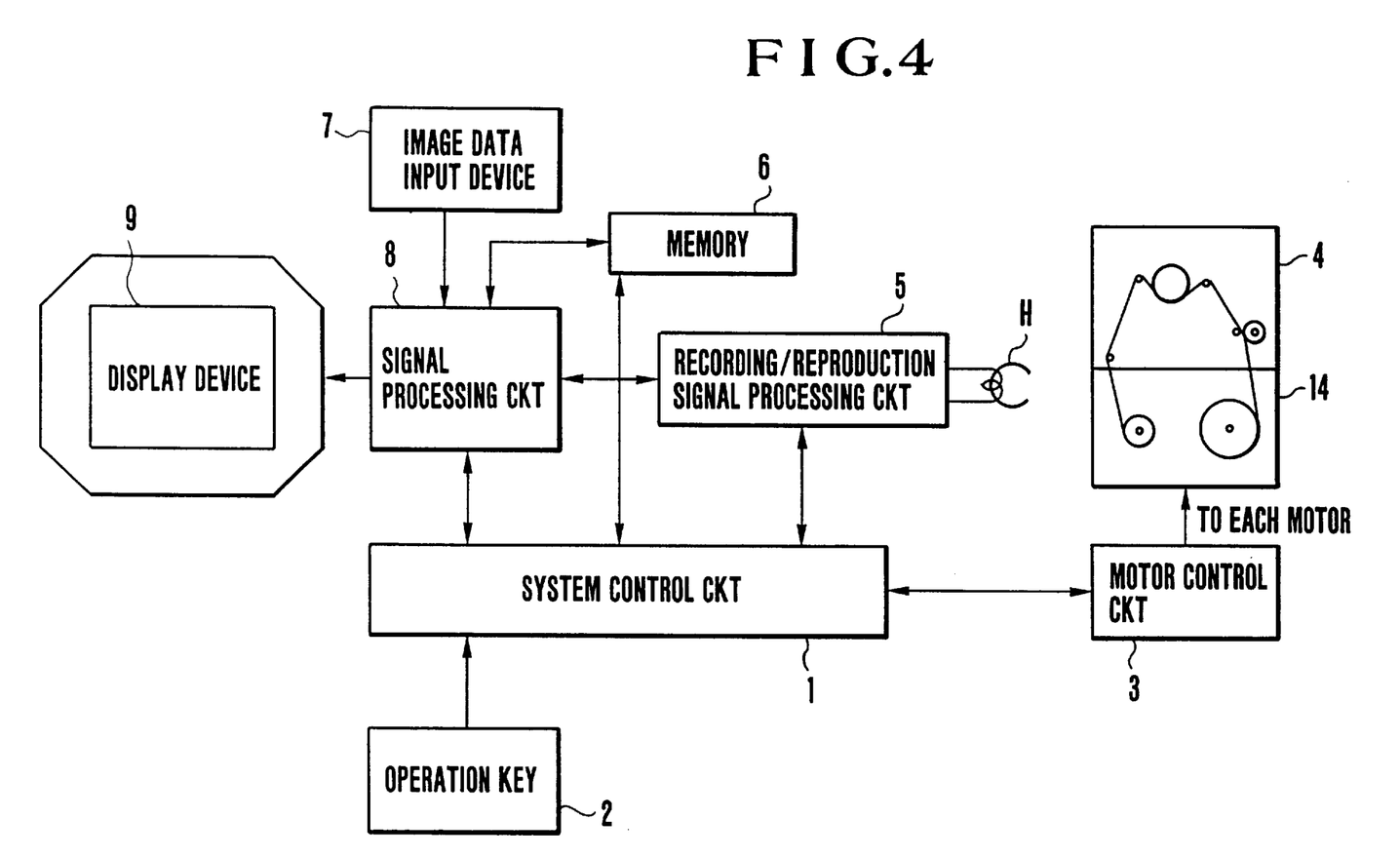
FIG. 4 is a block diagram showing in outline the arrangement of the essential parts of a recording apparatus arranged as an embodiment of this invention.

Some embodiments of this invention are described below with reference to the accompanying drawings:

FIG. 4 shows in outline the arrangement of a recording apparatus embodying this invention. In FIG. 4, reference numeral 4 denotes the body of a writing and reading device which is arranged to write and read image data into and out of a tape 14 by means of a magnetic head H. A recording/reproduction signal processing circuit 5 is arranged to perform signal processing actions necessary for recording and reproducing signals on and from the tape 14. A memory 6 is provided for storing information to be written into the TOC (table of contents) area of the tape 14, the writing positions of recording information of various kinds and image data which has been compressed. An image data input device 7 is arranged to input image data coming from a scanner or a video camera or the like. A signal processing circuit 8 is arranged to compress image data received from the image data input device 7, to send the compressed image data to the memory 6 and to process the image data into a state suited for a display to be made by a display device 9.

A system control circuit 1 is arranged to control the actions of the signal processing circuit 8 and the recording/reproduction signal processing circuit 5 and also the action of a motor control circuit 3 which is arranged to control motors included in the body 4 of the writing and reading device. These parts are controlled by the system control circuit 1 in accordance with an operation performed on an operation key 2.

The motor control circuit 3 controls the transport of the tape 14 by controlling a capstan motor and a reel motor disposed in the body 4 and also causes the signals to be recorded or reproduced by controlling a drum motor which is arranged to rotate a rotary head drum. The head H is mounted on the rotary head drum.

Figure 5:
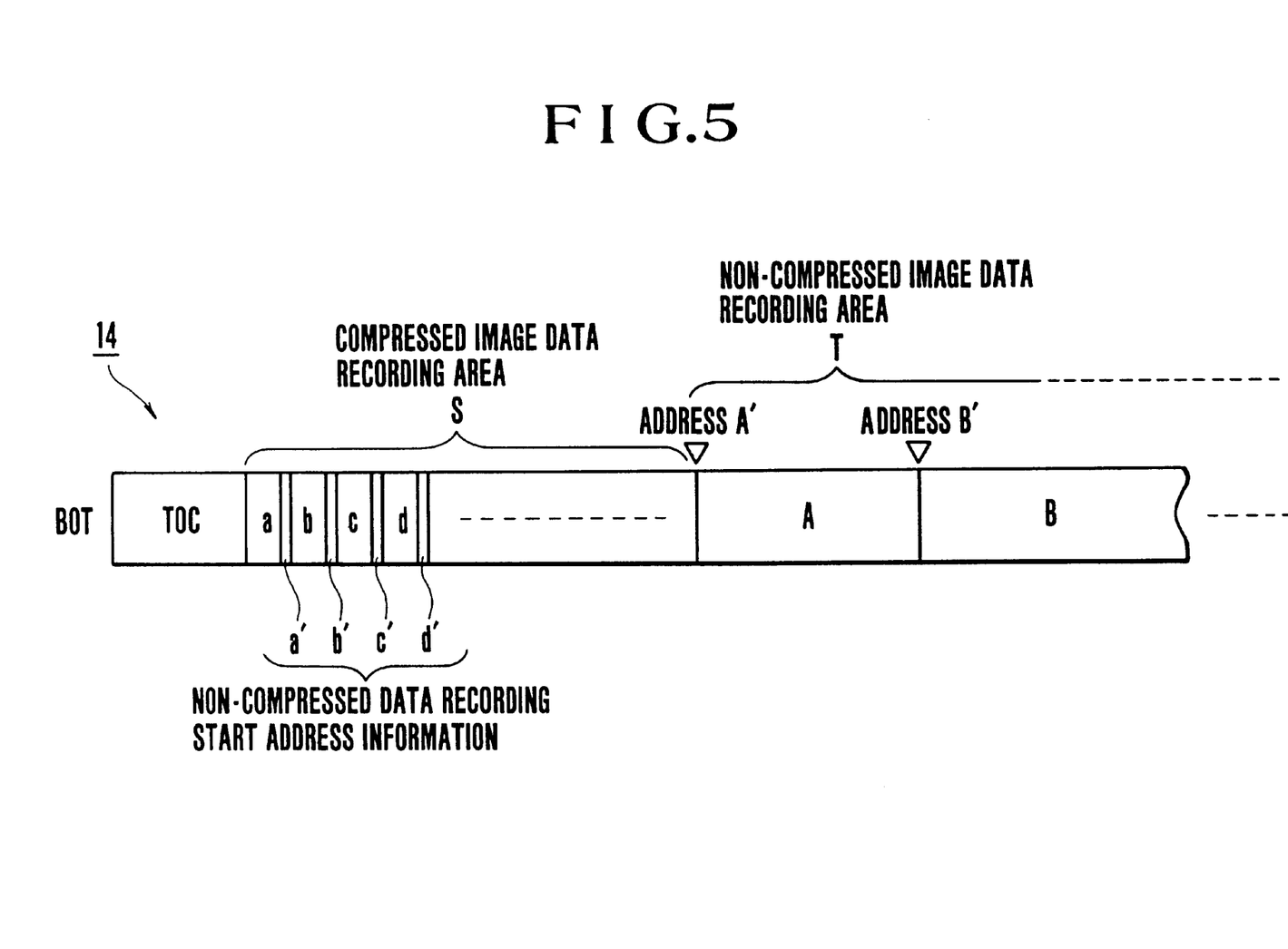
FIG. 5 shows a format employed by the recording apparatus of FIG. 4 for recording on the tape.

Referring to FIG. 5 which shows a format for recording data on the tape 14, the recording data to be recorded by the recording apparatus of this embodiment is arranged as follows: In the case of this embodiment, the recording area of the tape 14 is divided into a compressed image data recording area S and a non-compressed image data recording area T. Data to be recorded in the compressed image data recording area S include a plurality of compressed image (still image) data a, b, c, d, - - - which have been compressed by the signal processing circuit 8 to an extent such as a rate between ¼ and ¹⁄₁₆ at which the contents of an image display are comprehensible, although the image display may be somewhat coarse, and information a', b', c', - - - on the recording addresses A', B', - - - of non-compressed image (still image) data A, B, - - - corresponding to the compressed image data a, b, c, d, - - - . Data to be recorded in the non-compressed image data recording area T include a plurality of non-compressed image data A, B, - - - which have been obtained by processing input image data without any compressing process. A predetermined TOC area is disposed at the beginning portion of the tape 14.

Figure 6:
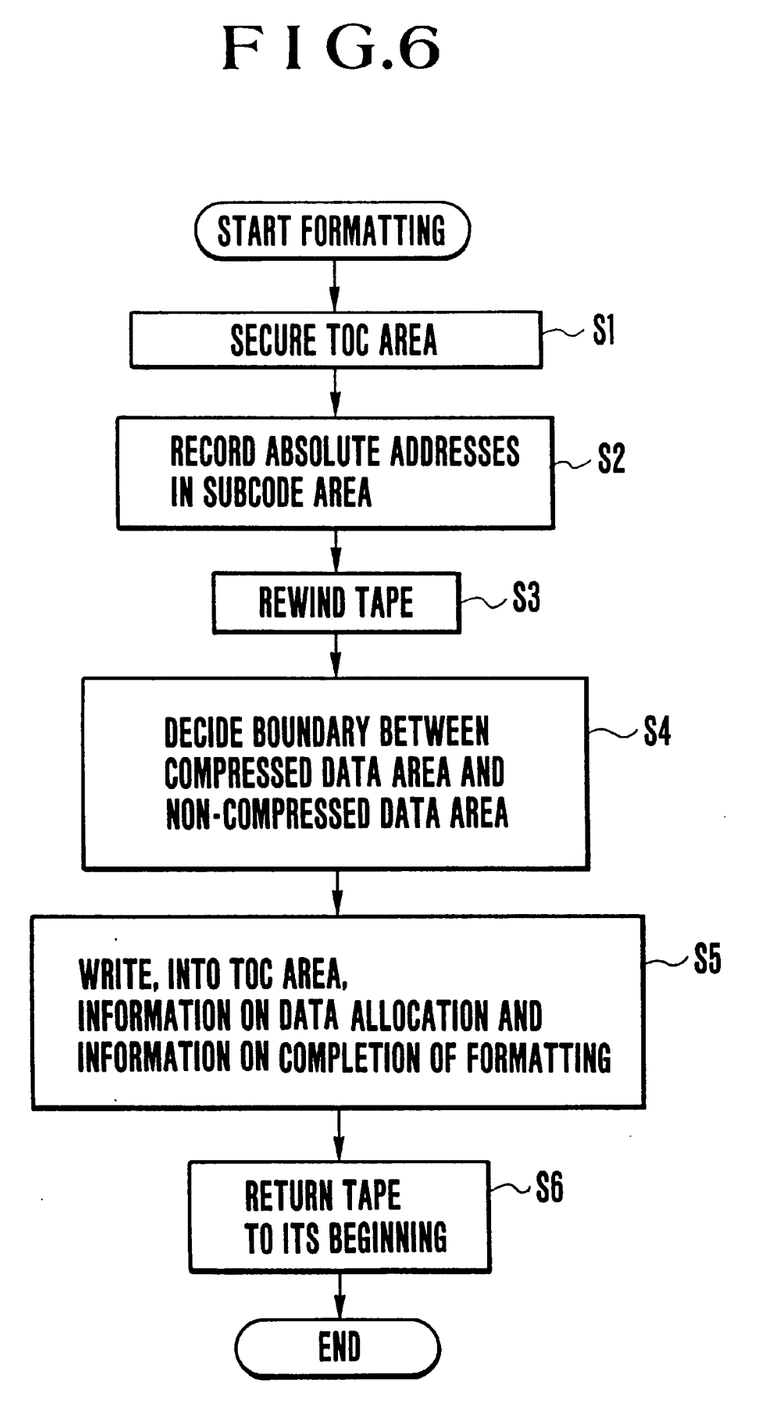
FIG. 6 is a flow chart showing the formatting action of the recording apparatus of FIG. 4 on the tape.
Figure 7:
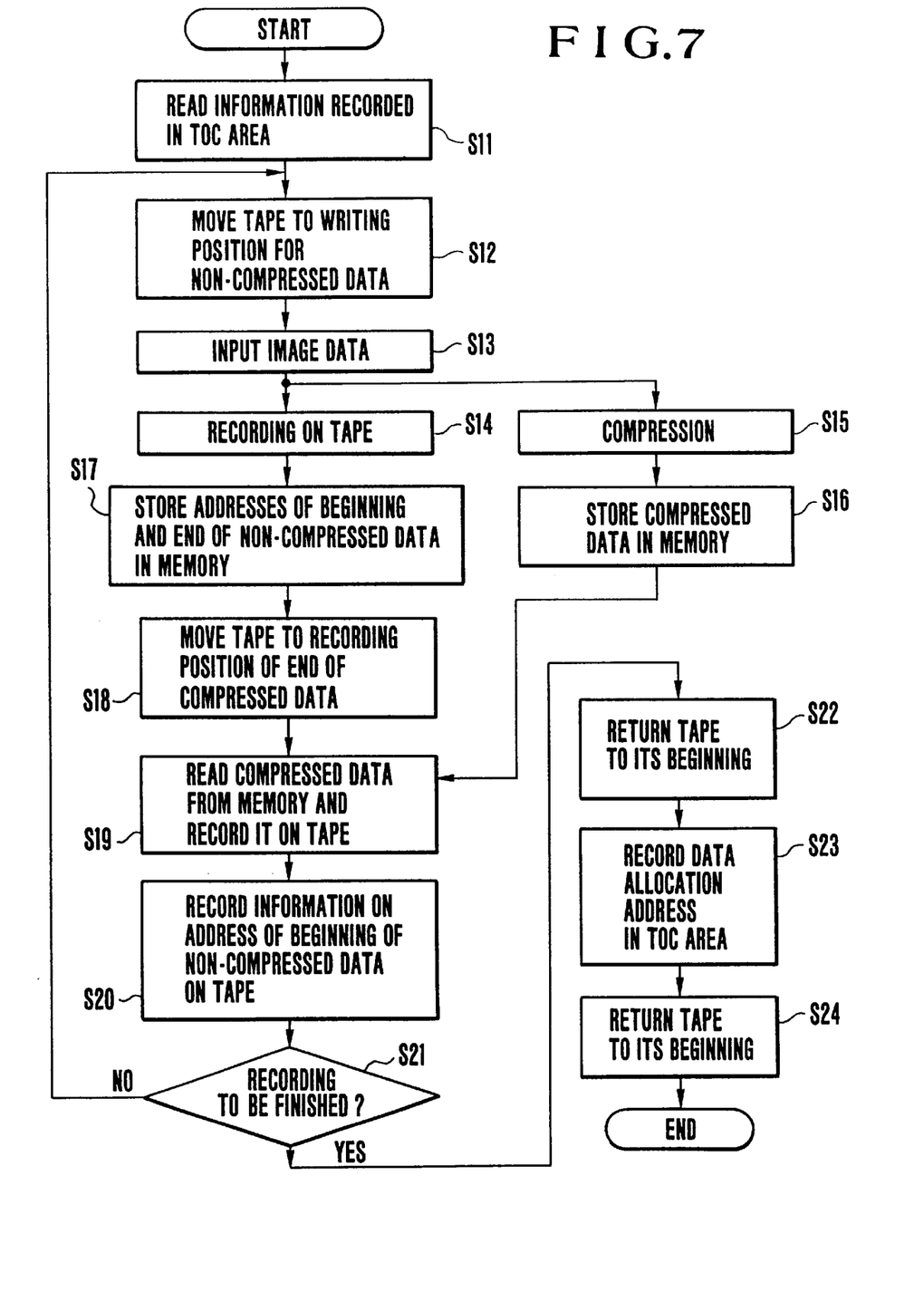
FIG. 7 is a flow chart showing the signal recording action of the recording apparatus of FIG. 4.

FIGS. 6 and 7 are flow charts showing the actions of the recording apparatus of FIG. 4. FIG. 6 shows the flow of a tape formatting action and FIG. 7 shows the flow of an image data recording action of the apparatus.

The tape formatting action is first described with reference to FIG. 6 as follows: When an instruction is given by operating the operation key 2 for the tape formatting action, the flow proceeds to a step S1. At the step S1: The system control circuit 1 causes the motor control circuit 3 to drive the capstan motor and the reel motor to move the tape 14 in such a way as to position the head H immediately after the above-stated TOC area for the purpose of securing the TOC area.

At a next step S2: Absolute addresses are recorded throughout the whole length of the tape after the TOC area. In this instance, each absolute address is recorded in a subcode area provided at one end of each of helical recording tracks on the tape. The absolute-address recording action is carried out by incrementing absolute address data by means of a counter provided within the system control circuit 1 and by modulating the address data through the recording/reproduction signal processing circuit 5. At that time, the motor control circuit 3 is of course caused to make the capstan motor and the reel motor transport the tape 14 at a given speed.

At a step S3: The tape 14 is rewound to have the head H positioned at the TOC area of the tape. The flow then comes to a step S4. At the step S4: The address of a boundary between the compressed image data recording area S and the non-compressed image data recording area T shown in FIG. 5 is decided by making reference to the value of the last absolute address (a maximum value). At this step, the number of recordable non-compressed images (still images) is also decided and an area necessary for recording the same number of compressed image data is secured as the compressed image data recording area S.

The compressed image data recording area S is disposed after the TOC area with the addresses decided for the area, in which the above-stated number of compressed image data a, b, c, - - - are to be recorded as well as information on the leader addresses a', b', c', - - - of the records of non-compressed image data corresponding to the respective compressed image data. The non-compressed image data recording area T is disposed after the compressed image data recording area S. After the step S4, the flow comes to a step S5. At the step S5: Information indicative of the allocation of the image data recording areas S and T and information indicative of the completion of the formatting process are written into the TOC area. At a step S6: The tape 14 is rewound back to its beginning position and the formatting action comes to an end.

Next, the flow of the recording action is described with reference to FIG. 7 as follows:

When the tape is loaded after a power switch is turned on, the flow comes to a step S11. At the step S11: The tape recording/reproduction apparatus reads the data allocation information from the TOC area located in the leading part of the tape. At a step S12: The last of the addresses of the non-compressed image data finally written in the non-compressed image data recording area T is extracted from the data allocation information. The tape is moved to this last address. The system control circuit 1 then sends out a signal to cause a display "RECORDING OK" to be made at the display device 9. After that, the flow comes to a step S13. At the step S13: Image data to be recorded is received from the image data input device 7. At a step S14: The image data is written in the non-compressed image data recording area T of the tape. At a step S15: At the same time, the signal processing circuit 8 performs the compressing process on the input image data. At a step S16: The compressed image data is temporarily stored in the memory 6. At a step S17: Upon completion of writing the non-compressed image data into the non-compressed image data recording area T, the addresses of the beginning and end parts of the written image data are stored in the memory 6 as new data allocation information.

At a step S18: The address of the end position of the compressed image data as last written is extracted from the above-stated data allocation information. The tape is moved to the address extracted. At a step S19: The compressed image data is read out from the memory 6 and is recorded on the tape. At a step S20: Immediately after the recording, information on the address of the leading part of the recorded non-compressed image data which corresponds to the compressed image data read out from the memory 6 and recorded at the step S19 is recorded on the tape. At a step S21: One round of recording sequence comes to an end. Then, the address of the end position of the compressed image data is also stored in the memory 6 as the above-stated data allocation information.

In a case where a plurality of images are to be continuously recorded, the flow described above comes back from the step S21 to the step S12 to repeat the sequence of recording processes described above. Then, in terminating the recording, the flow comes to a step S22. At the step S22: The tape is rewound to its beginning position. At a step S23: The recording allocation addresses of the non-compressed and compressed image data to be recorded next time (end addresses) are recorded as data allocation information. At a step S24: The tape is rewound to its beginning position and the flow of all the recording processes is completed.

In reproducing the record, the data allocation information is read out from the TOC area. After that, the compressed image data is first reproduced to find out necessary information. Since the image data is in a compressed state, the length of time required in reading is reduced to a length of time corresponding to the compression ratio, which is between ¼ and ¹⁄₁₆ in the case of this embodiment. Therefore, a display can be quickly made. Further, the tape moving amount within the compressed image data recording area S can be lessened in finding specific images out of many image records. The speed of the search thus can be increased according to the compression ratio employed.

Further, while the embodiment is arranged to compress the image data in the manner which makes the image somewhat coarse as mentioned above, use of a high-efficiency compressing method having reversibility would almost completely eliminate the possibility of image deterioration. In that instance, the compressed image data can be reproduced and displayed, at the time of reproduction, by arranging the signal processing circuit 8 to include an expansion circuit. This invention can be practiced by using any other compressing method.

Further, the embodiment is arranged to write the leading address of each of the non-compressed image data corresponding to the compressed image data immediately after the record of the compressed image data. However, in the event of such a data recording format that has a main data area and a sub-data area like in the case of a digital audio tape recorder, for example, the arrangement of the embodiment may be changed to record the compressed image data in the main data area and to write information on the leading address of the corresponding non-compressed image data in the sub-data area.

Each of the embodiments described above is arranged to permit reproduction of a specific image with the non-compressed image data by first reproducing the compressed image data to find the specific image, so that any desired image can be easily and quickly reproduced.

As described above, the apparatus shown in FIGS. 4 to 7 is arranged such that the input image data from an image data input means is compressed by the signal processing circuit; the compressed image data is stored temporarily in the memory; the input image data is recorded in a non-compressed state in the non-compressed image data recording area of the tape by a writing and reading means; then, information on the recorded positions of the non-compressed image data is also temporarily stored in the memory; and, after that, the compressed image data is recorded, together with the information on the recording position of the non-compressed image data of the image, in the compressed image data recording area of the tape.

In other words, the non-compressed image data representing a plurality of images are recorded in the non-compressed image data recording area of the tape, the compressed image data representing the same plurality of images are recorded in the compressed image data recording area of the tape together with the information about the recorded positions of the non-compressed image data of the same images.

At the time of image reproduction, a specific image is first searched out by reproducing the compressed image data of the plurality of images recorded in the compressed image data recording area. Then, the specific non-compressed image data can be easily and quickly read out for reproduction from among other non-compressed image data records in the non-compressed image data recording area on the basis of information on the recorded position of the non-compressed image data of the specific image.

As described above, the recording/reproduction apparatus according to this invention is capable of easily and quickly searching out a desired specific image and is capable of reproducing it without degrading the quality of the image, so that the problem with the tape-shaped recording medium can be solved by the apparatus.

Figure 8:
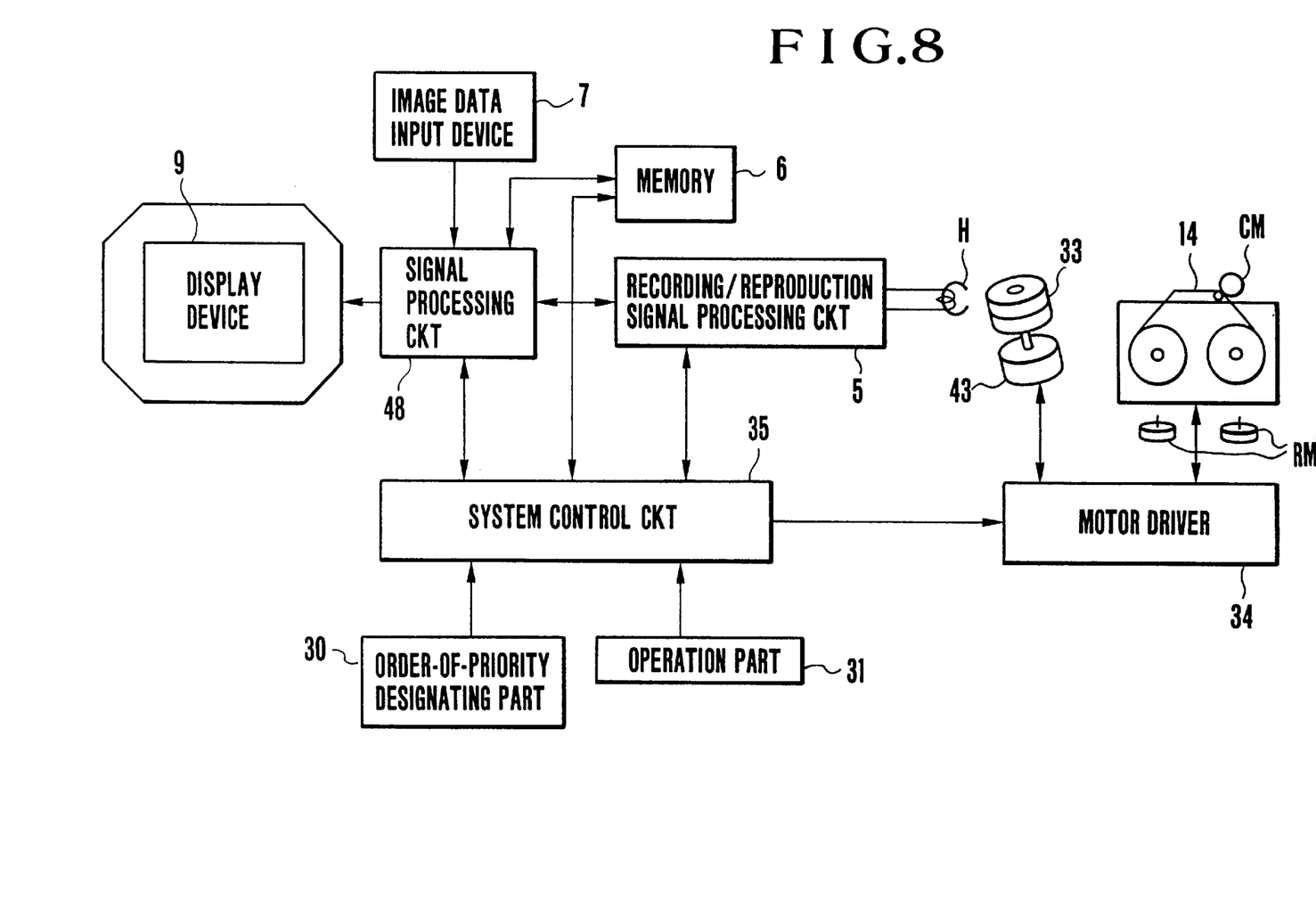
FIG. 8 is a block diagram showing in outline the arrangement of the essential parts of a recording apparatus arranged as another embodiment of the invention.

Another embodiment of this invention is described with reference to FIGS. 8 to 11 as follows: FIG. 8 shows in outline the arrangement of a recording apparatus. The same components as those shown in FIG. 4 are indicated by the same reference numerals.

Referring to FIG. 8, the illustration includes a capstan motor CM, a reel motor RM, a rotary head drum 33 on which a head H is mounted, a drum motor 43 which drives the rotary head drum 33, and a motor driver 34 which is provided for control over the actions of the capstan motor CM, the reel motor RM and the drum motor 43.

A signal processing circuit 48 is arranged to receive still image data or letter/picture data from an image data input device 7 which is a scanner, a video camera or the like; to perform processing actions such as compression, error correction, encoding, etc.; and to supply the image data thus processed to the recording/reproduction signal processing circuit 5 or to the display device 9. A system control circuit 35 controls the whole apparatus. An order-of-priority designating part 30 which is manually operable is provided for designating the order of priority according to sorting of recording information as will be described later. The apparatus has another operation part 31.

Figure 9:
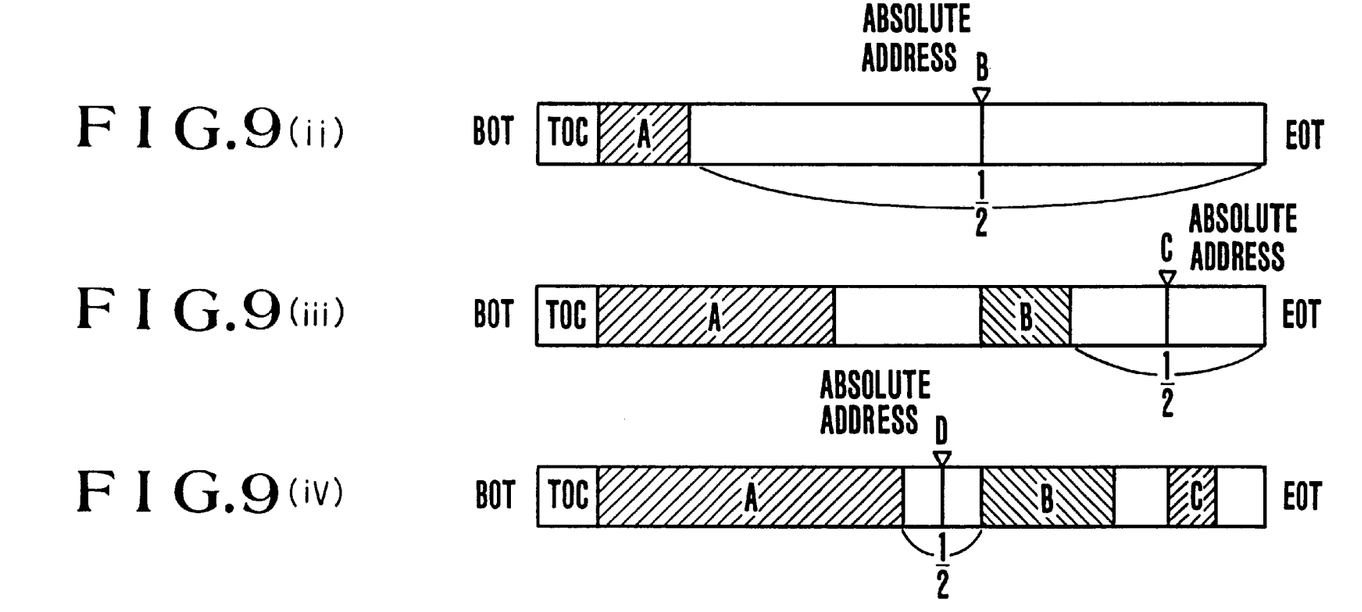
Figure 9I:
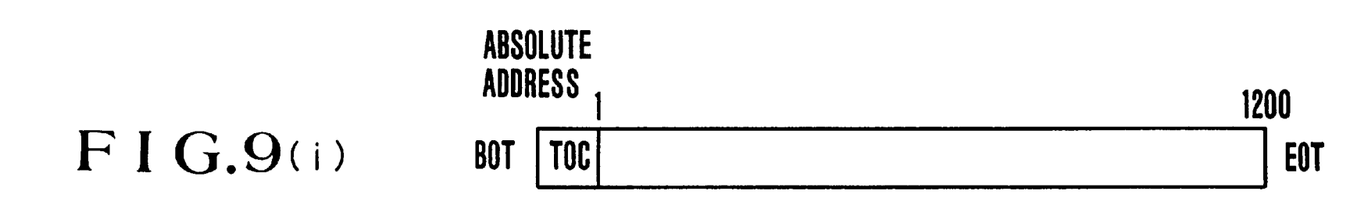
FIGS. 9(i) to 9(v) show the tape area dividing method of the recording apparatus shown in FIG. 8.
Figure 9V:
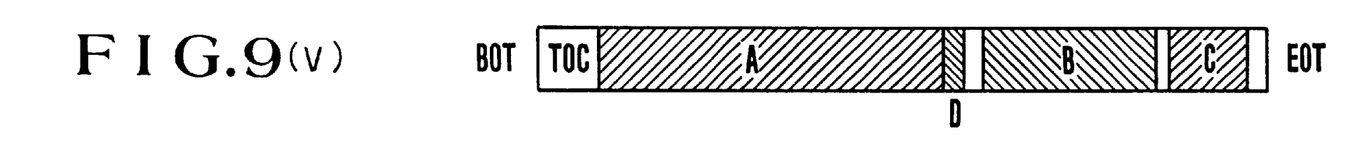
Figure 10:
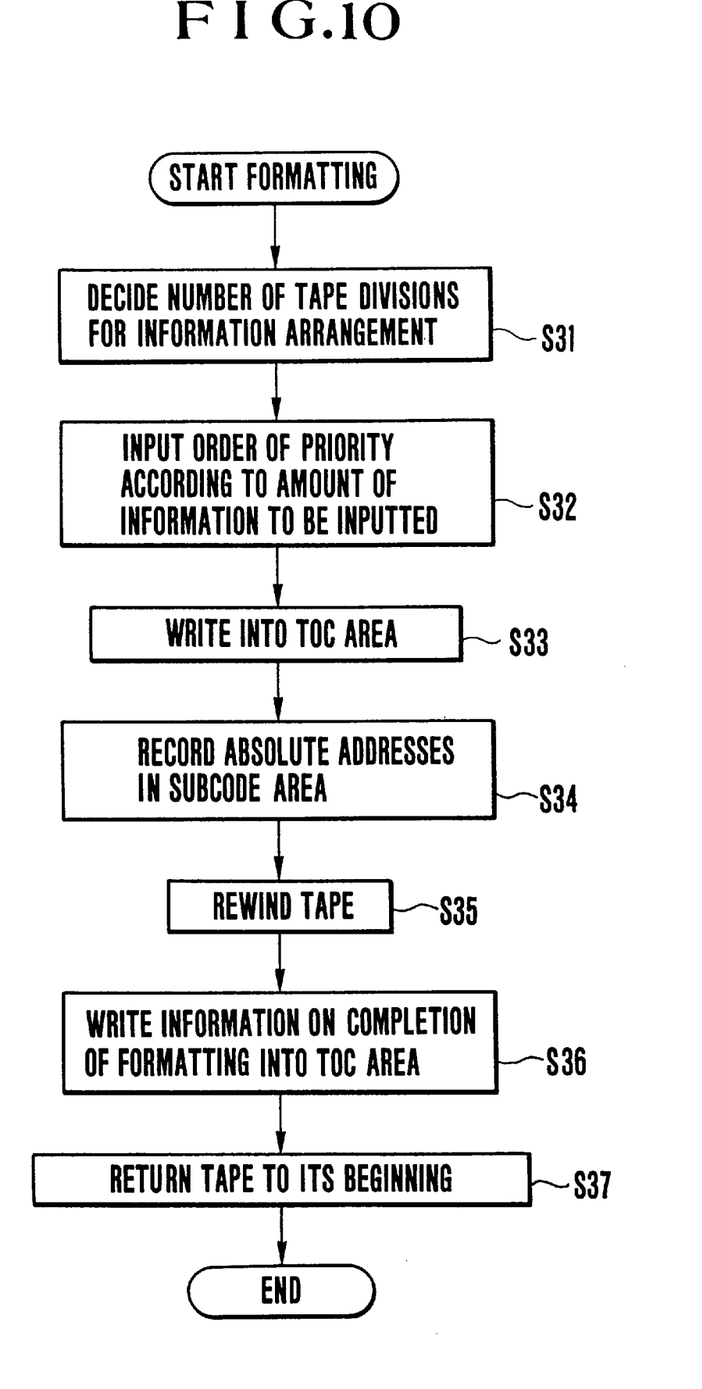
FIG. 10 is a flow chart showing the formatting action on the tape of the recording apparatus of FIG. 8.

FIGS. 9(i) to 9(v) show the manner in which the recording area of the tape is divided by the recording apparatus of FIG. 8. The actions of the recording apparatus of this embodiment are described below with reference to FIGS. 10 and 11 which are flow charts:

Referring to the flow chart of FIG. 10, the flow of the formatting action on the tape of the apparatus is first described as follows: When an instruction is given from the operation part 31 for commencement of the formatting action, the flow comes to a step S31. At the step S31: Information on the number of sorting kinds or categories of input information, i.e., the number of divisions of the area of the tape 14 is first obtained from the order-of-priority designating part 30. At a next step S32: Information on the order of priority for the kinds of input information to be sorted out is obtained also from the order-of-priority designating part 30. The information obtained at the steps S31 and S32 is stored in the memory 6.

At a step S33: The information stored in the memory 6 is written in the TOC area of the tape 14. At this step, the system control circuit 35 controls the motor driver 34 to cause the tape 14 to be transported at a given speed. The information on the number of sorting kinds or categories and the order of priority is recorded in the TOC area by the head H through the signal processing circuit 48 and the recording/reproduction signal processing circuit 5.

At a step S34: Absolute addresses are written into subcode areas provided at the ends of the helical recording tracks on the tape 14 one after another by moving the tape 14 from its beginning (BOT) to its end (EOT) at a given speed. Upon completion of the recording of the absolute addresses, the flow comes to a step S35. At the step S35: The tape 14 is rewound back to the TOC area. At a step S36: Information indicative of the completion of formatting is written into the TOC area. At a step S37: The tape is further rewound to its BOT position and the formatting action comes to an end.

Figure 11:
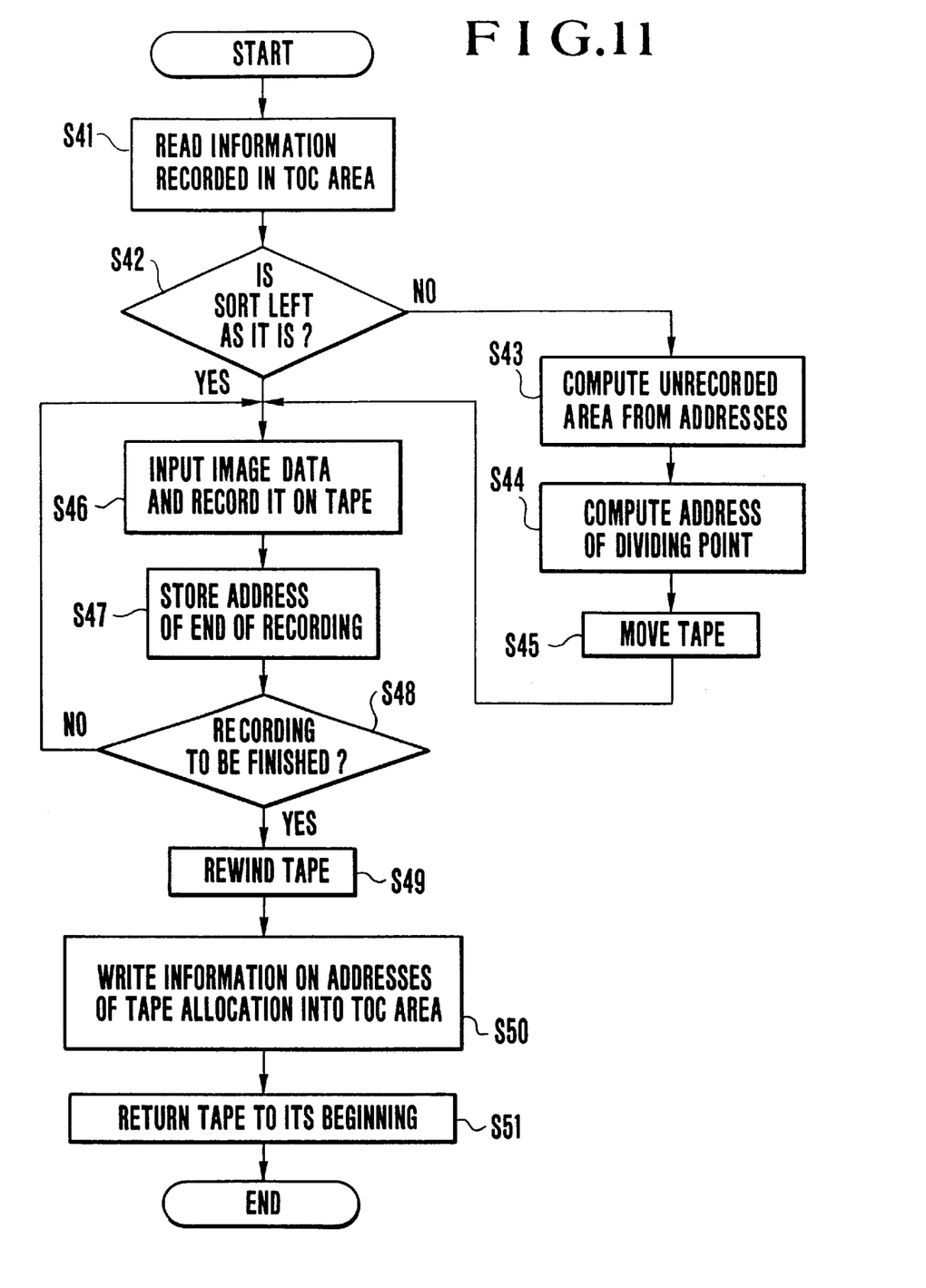
FIG. 11 is a flow chart showing the recording action of the recording apparatus of FIG. 8.

The apparatus according to this embodiment writes in and records the sorted information on the tape as described below with reference to the flow chart of FIG. 11:

At the time of formatting, the number of sorting kinds of information to be recorded, and the order of priority for recording area allocation according to the amount of information of each sorted kind are recorded in the TOC area. Therefore, at a step S41, the information recorded in the TOC area is first read out. Further, in the case of this embodiment, the amount of information of a sorted kind or category A which is to be recorded within a divided recording area A is assumed to be the largest among all the sorting categories to be recorded in a total of four divided recording areas A, B, C and D, which correspond to the sorting designation. With the number of sorting kinds or categories designated to be four like in this case, the recording action is performed as follows:

In a case where the tape is formatted as shown in FIG. 9(i), the absolute addresses are respectively allotted to all parts of the tape from the beginning part (BOT) to the end part (EOT) of the tape. In the case shown, the last of the absolute addresses is assumed to be 1200 for the sake of illustration.

Since the amount of information of the category A to which the divided recording area A is allocated is the largest, the information of the category A is first recorded after the TOC area as shown in FIG. 9(ii). At a step S42: If the input is found to be the information of another category B which is to be recorded in another divided recording area B, the flow comes to a step S43. At the step S43: The system control circuit 35 computes and finds out an area which has the largest remainder of unrecorded area from the last address of information currently recorded in the divided recording area A and the divided area allocation addresses of the whole tape. At a step S44: The system control circuit 35 divides the remaining area, for example, into two equal parts and computes the address of the dividing point. At a step S45: The tape is moved to this dividing address B. At a step S46: Image (still image) data to be used as recording information is inputted and recorded.

Upon completion of the recording of information on one still image or a letter/picture, the flow comes to a step S47. At the step S47: The address of the end point of this recording is stored in the memory 6 and the flow comes to a step S48. At the step S48: A check is made for the end of the still image information recording. If the recording is not finished, the flow comes back to the step S46. If the recording is finished, the flow comes to a step S49. At the step S49: The tape 14 is rewound. At a step S50: Allocation address information which permits a discrimination between a recorded address and an unrecorded address is written into the TOC area. At a step S51: The tape is rewound back to the BOT part and the recording action comes to an end.

As described above, the system control circuit 35 is arranged to always store the recorded and unrecorded addresses according to the last address of the recorded data recording area and the leading address of the next divided recording area; and then to record newly sorted information in an unrecorded area, beginning with an area having the largest continuous unrecorded area, by dividing the unrecorded area into two equal parts as shown in FIGS. 9(ii), 9(iii), 9(iv) and 9(v). The amount of vacant areas left on the tape thus can be lessened. A divided recording area allocated to the sorted category of information having a larger amount of information is used in a greater amount for recording on the tape while a divided recording area allocated to another category of information having a smaller amount of information is used in a smaller amount, so that the tape can be efficiently used according to the sorting of recording information.

Further, in making a search, the existence of interrelated information (image data) in a state of being gathered together within one and the same recording area enables the operator to quickly look up information belonging to the same category, so that the recorded information can be effectively used.

In accordance with this invention, as described in the foregoing, the order of priority for allocation of the recording area among different categories or kinds of information decided according to the amount of information to be recorded is inputted by an order-of-priority input means for every category of information. In accordance with the order of priority for recording area allocation among the different categories of input information, a recording area dividing means divides and allocates the unrecorded area of the tape. Then, a tape transporting and recording unit records information of the same kind or category in one and the same recording area.

In other words, a larger recording area is allocated to the information of the kind having a larger amount of recording information and a smaller recording area is allocated to the information of the kind having a smaller amount of recording information, so that the efficiency of use of the tape can be enhanced by saving the recording capacity of the tape from being wasted. In accordance with this invention, information belonging to the same category of the sorting action is gathered together and is recorded in one and the same recording area. Therefore, at the time of reproduction, any desired information can be easily and quickly searched out. Besides, the invented arrangement effectively facilitates utilization of interrelated parts of information recorded.

What is claimed is:

1. An image information recording apparatus comprising:
   a) input means for inputting image information;
   b) processing means for processing the image information input by said input means, to output a first image signal and a second image signal which represents the same image as that indicated by the first image signal, the first and second image signals including at least an image signal for one picture, respectively, the amount of information of the first image signal for one picture being greater than that of the second image signal for one picture, the amount of the second image signal being compressed by a highly efficient compressing method; and
   c) recording means for dividing a tape-shaped recording medium into a first image signal recording area and a second image signal recording area and for recording the first and second image signals on a tape-shaped recording medium, said recording means comprising a rotary head for forming a plurality of helical tracks on the tape-shaped recording medium and for recording first and second image signals onto the plurality of helical tracks, said recording means being arranged to record with said rotary head the second image signal and positional information being indicative of a position at which the first image signal corresponding to the second image signal is recorded on the tape-shaped recording medium on a predetermined helical track of the plurality of helical tracks in the second image signal recording area and to record with said rotary head the first image signal representing the same image as that indicated by the second image signal which has been recorded on the predetermined helical track in the second image signal recording area, on a helical track other than the predetermined helical track of the plurality of helical tracks.

2. An apparatus according to claim 1, wherein said recording means includes transport means for transporting the tape-shaped recording medium and control means for controlling actions of said transport means and said processing means, and wherein said control means is arranged to cause said transport means to transport the tape-shaped recording medium after the first image signal has been recorded and, after that, to cause the second image signal stored in said memory to be recorded on the tape-shaped recording medium.

3. An apparatus according to claim 1, wherein said image information is still image information, and wherein said recording means is arranged to be capable of recording the first and second image signals which correspond to image information of a plurality of still images.

4. An apparatus according to claim 1, wherein said recording means is arranged to record the second image signal and said positional information only in said second image signal recording area on the tape-shaped recording medium extending from a beginning of the tape-shaped recording medium and to record the first image signal only in said first image signal recording area located after the second image signal recording area.

5. An apparatus according to claim 1, wherein said processing means includes a memory, and wherein said processing means is arranged to output the first image signal without compressing the image information input by said input means and to compress the image information input by said input means and store the compressed image information in said memory as the second image signal.

6. An apparatus according to claim 1, wherein said second image signal recording area is located at a beginning portion of the tape-shaped recording medium, and said first image signal recording area is located after said second image signal recording area.

7. An image information recording apparatus, comprising:
   a) input means for inputting image information;
   b) processing means for processing said image information, said processing means being capable of outputting a first image signal relating to said image information and consisting of a plurality of kinds of image signal and a second image signal consisting of a plurality of kinds of image signal which represent the same image as that indicated by the plurality of kinds of image signal of said first image signal, respectively, said first and second image signals, respectively, including at least an image signal for one picture, the amount of information of the first image signal being greater than that of the second image signal for one picture; and
   c) recording means for dividing a tape-shaped recording medium into a first image signal recording area and a second image signal recording area and for recording the first and second image signals on the tape-shaped recording medium, said recording means comprising a rotary head for forming a plurality of helical tracks on the tape-shaped recording medium to record said second image signal on a predetermined helical track of the plurality of helical tracks in the second image signal recording area on the tape-shaped recording medium and to record said first image signal representing the same image as that indicated by said second image signal which has been recorded on the predetermined helical track in the second image signal recording area, on a helical track other than said predetermined helical track of the plurality of helical tracks, wherein said recording means is arranged to record positional information concerning recording positions of the plurality of kinds of image signal of said first image signal on said tape-shaped recording medium, adjacent to the corresponding plurality of kinds of image signal of said second image signal, respectively.

8. An apparatus according to claim 7, wherein said plurality of kinds of image signal of said second image signal are those which are produced by compressing the corresponding plurality of kinds of image signal of said first image signal, respectively.

9. An apparatus according to claim 7, further comprising:

designating means for designating a predetermined image from among the plurality of kinds of image signal of the second image signal recorded on said tape-shaped recording medium; and reproducing means for reproducing the first image signal corresponding to the image signal designated by said designating means.

10. An apparatus according to claim 7, wherein said second image signal recording area has a helical track formed at the beginning portion of the tape-shaped recording medium.

11. An image information recording apparatus, comprising:

a) input means for inputting image information;

b) processing means for processing the image information input by said input means, to output a first image signal and a second image signal which represents the same image as that indicated by the first image signal, the first and second image signals including at least an image signal for one picture, respectively, the amount of information of the first image signal for one picture being greater than that of the second image signal for one picture, the amount of the second image signal being compressed by a highly efficient compressing method; and c) recording means for dividing a recording medium into a first image signal recording area and a second image signal recording area and for recording the first and second image signals at different locations on the recording medium, said recording means comprising a head for recording the first and second image signals onto a plurality of tracks formed on the recording medium, said recording means being arranged to record with the head the second image signal and positional information representing a location at which the first image signal corresponding to the second image signal is recorded on the recording medium on a track of the plurality of tracks in the second image signal recording area and to record with the head the first image signal representing the same image as that indicated by the second image signal which has been recorded in the second image signal recording area, on a track of the plurality of tracks in the first image signal recording area.

* * * * *

UNITED STATES PATENT AND TRADEMARK OFFICE
CERTIFICATE OF CORRECTION

PATENT NO.   : 6,377,746 B1
DATED        : April 23, 2002
INVENTOR(S)  : Hideyuki Nishida et al.

It is certified that error appears in the above-identified patent and that said Letters Patent is hereby corrected as shown below:

<u>Column 3,</u>
Line 17, delete "a ea" and insert -- area --.

Signed and Sealed this

Twenty-first Day of January, 2003

JAMES E. ROGAN
*Director of the United States Patent and Trademark Office*